(12) United States Patent
McCormick

(10) Patent No.: US 11,618,984 B2
(45) Date of Patent: Apr. 4, 2023

(54) SYSTEM AND METHOD FOR QUILTING BINDING GUIDE

(71) Applicant: CM Designs, Inc., Franktown, CO (US)

(72) Inventor: Carolyn D McCormick, Franktown, CO (US)

(73) Assignee: CM Designs, Inc.

( * ) Notice: Subject to any disclaimer, the term of this patent is extended or adjusted under 35 U.S.C. 154(b) by 55 days.

(21) Appl. No.: 17/407,269

(22) Filed: Aug. 20, 2021

(65) Prior Publication Data

US 2023/0056505 A1 Feb. 23, 2023

(51) Int. Cl.
*D05B 97/02* (2006.01)
*G01B 3/04* (2006.01)
*B26B 29/06* (2006.01)

(52) U.S. Cl.
CPC .............. *D05B 97/02* (2013.01); *B26B 29/06* (2013.01); *G01B 3/04* (2013.01); *D05D 2305/08* (2013.01)

(58) Field of Classification Search
None
See application file for complete search history.

(56) References Cited

U.S. PATENT DOCUMENTS

| | | | |
|---|---|---|---|
| 4,608,939 A | 9/1986 | Lampley | |
| 4,945,642 A * | 8/1990 | Saulietis | A41H 31/00 33/12 |
| D311,873 S | 11/1990 | Arend | |
| 5,579,670 A * | 12/1996 | McCormick | A41H 31/00 83/56 |
| 6,276,070 B1 * | 8/2001 | Hawley | D05B 97/12 33/1 G |
| 6,925,724 B2 | 8/2005 | Tandy | |
| D549,954 S | 9/2007 | Jirak | |
| 7,854,073 B1 * | 12/2010 | Webb | D05B 97/12 33/1 G |
| 8,186,072 B1 * | 5/2012 | Nethery | D05B 97/12 33/565 |
| 8,186,073 B2 | 5/2012 | Nethery | |
| 8,397,396 B2 | 3/2013 | Nethery | |
| 8,499,470 B1 | 8/2013 | Hilton | |
| D816,321 S | 5/2018 | Rieger | |
| 9,962,845 B2 * | 5/2018 | McCormick | B26B 25/005 |
| 10,391,656 B2 | 8/2019 | Oey | |
| 10,695,925 B1 | 6/2020 | Volk | |
| 10,760,206 B1 | 9/2020 | Carr | |
| 2015/0322297 A1 | 11/2015 | Yeh | |
| 2020/0131680 A1 * | 4/2020 | Massey | B25H 7/02 |
| 2020/0298432 A1 | 9/2020 | Volk | |

* cited by examiner

*Primary Examiner* — Christopher W Fulton
(74) *Attorney, Agent, or Firm* — Daniel W. Roberts; Law Offices of Daniel W. Roberts, LLC

(57) ABSTRACT

The binding guide is provided by a substantially rigid translucent non-regular hexagon body, having first, second, third, fourth, fifth and sixth peripheral edges. The first, second and third peripheral edges define a generally rectangular section of the translucent body. The fourth, fifth and sixth peripheral edge sections define a generally obtuse pointed section of the translucent body. At least one isosceles triangular ruling for establishing a binding margin is aligned to the third peripheral edge, as is at least one binding width guideline proximate to the third peripheral edge. At least one set of aligned apertures is disposed within the translucent body to uniformly fold the binding margin. And associated method of use is also provided.

29 Claims, 9 Drawing Sheets

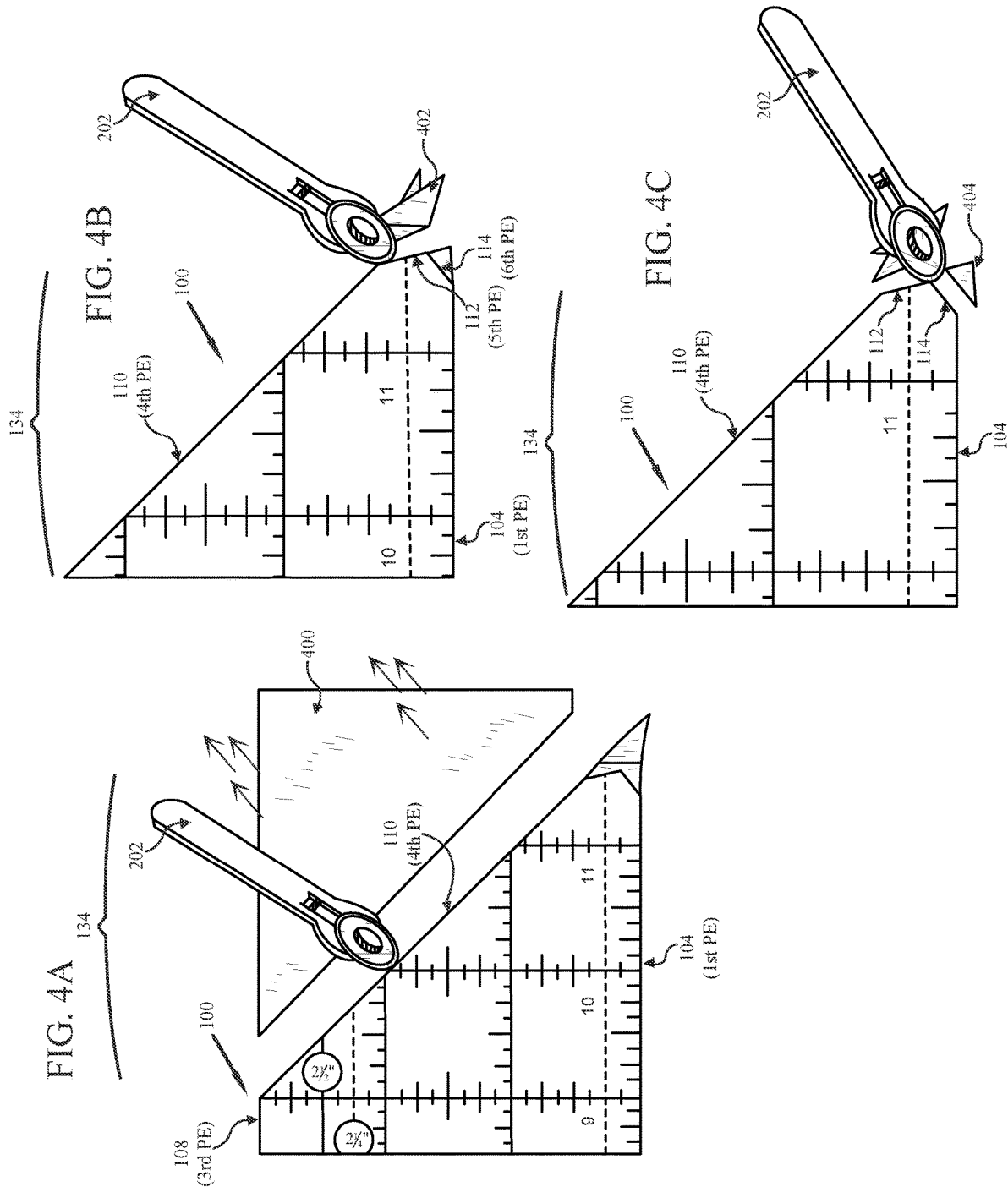

SYSTEM AND METHOD FOR QUILTING BINDING GUIDE

FIELD OF THE INVENTION

The present invention relates generally to the field of quilting, and more specifically to a quilting binding guide—specifically a single device that serves to aid the user in establishing a consistent and properly sized binding to be stitched around the outside of a quilt.

BACKGROUND

Quilting requires precision sewing to fit all the various pieces of a pattern together. Once stitched together, these various pieces collectively provide the core of a quilt which is typically finished by providing a margin of fabric that is stitched about the peripheral edge to provide a finished edge covering all end seams. This finished margin is commonly referred to as the binding edge, or more simply—the binding.

As with the quilt pattern itself, the binding is typically fabricated from multiple pieces of smaller fabric, sewn together in such a fashion to be smooth and lie flat without bunching where the necessary seams occur.

Various options have been developed to aid in the development and attachment of this binding. For example, U.S. Patent Publication 2020/0298432 to Volk and U.S. Pat. No. 10,695,925 to Volk each provide a variation on Quilt Binding Cutting Guide which provides assistance for the final cutting and alignment of the binding, but each fails to assist with the actual creation of the binding itself.

Various guides for cutting quilt fabric are also known, such as U.S. Pat. No. 8,499,470 to Hilton for Template for Cutting Quilting Fabrics, but Hilton is intended to help cut pieces of fabric that are used for the pattern within the quilt and provide no assistance with respect to the formation of the binding.

Quilting rulers are also known, such as U.S. Pat. No. 8,186,073 to Neethery which provides a Quilting Template and Ruler, and U.S. Pat. No. 6,925,724 to Tandy for a Quilting Ruler—but again these rulers and guides are perhaps helpful for measuring piece of fabric used for quilting, but they fall short of actually helping to assist with consistently and reliably thrilling the binding margin that is smooth and un-bunched with respect to the seams.

In addition, the binding must be uniform wrapping evenly around from the front to the back of the quilt, so forming the fabric material into a uniform fabric element with a consistent width is challenging.

Moreover, as quilting is a process requiring the cutting and assembly of multiple pieces of fabric—including for the formation of the binding, it is a process that typically requires a plurality of different tools—that often include physically distinct guides and rulers for the measurement of some elements and cutters for the trimming and cutting of fabric.

Keeping track of tools can be a challenge if the quilting project involves large amounts of fabric which may inadvertently cover a tool, or if the quilting project is being worked on in an environment where extra space is limited.

Hence there is a need for a method and system that is capable of overcoming one or more of the above identified challenges.

SUMMARY OF THE INVENTION

Our invention solves the problems of the prior art by providing novel systems and methods for a singular device that advantageously provides alignment references, cutting guides and folding guides for the creation of a quilt binding margin such that the seams of the fabric pieces comprising the binding margin lie flat without bunching when the guide is used to uniformly and consistently fold the fabric to provide the binding margin with a consistent width.

In particular and by way of example only, according to one embodiment of the present invention, provided is a binding guide including: a substantially rigid translucent body, having first, second, third, fourth, fifth and sixth peripheral edges, the first and third peripheral edges being parallel to each other and extending normally from the second peripheral edge, the first peripheral edge being longer than the third peripheral edge; the fourth peripheral edge extending at a first angle from a first distal end of the third peripheral edge generally towards a first plane defined by the first peripheral edge, the sixth peripheral edge extending at a second angle from a second distal end of the first peripheral edge towards a second plane parallel to the first plane, the second plane defined by the third peripheral edge, the fifth peripheral edge joining the fourth peripheral edge and the sixth peripheral edge, at least one isosceles triangular ruling for establishing a binding margin, the least one isosceles triangular ruling aligned to the third peripheral edge; and at least one binding width guideline proximate to the third peripheral edge.

In yet another embodiment, provided is a binding guide including: a substantially rigid translucent non-regular hexagon body, having first, second, third, fourth, fifth and sixth peripheral edges, the first, second and third peripheral edges defining a generally rectangular section of the translucent body, the fourth, fifth and sixth peripheral edge sections defining a generally obtuse pointed section of the translucent body; and at least one isosceles triangular ruling for establishing a binding margin, the least one isosceles triangular ruling aligned to the third peripheral edge; and at least one binding width guideline proximate to the third peripheral edge.

And for yet another embodiment, provided is a binding guide including: a substantially rigid translucent non-regular hexagon body, having first, second, third, fourth, fifth and sixth peripheral edges, the first and third peripheral edges being parallel to each other and extending normally from the second peripheral edge, the first peripheral edge being longer than the third peripheral edge; the fourth peripheral edge extending at a first obtuse angle away from the third peripheral edge; the sixth peripheral edge extending at a second away from the first peripheral edge; the fifth peripheral edge extending at a third obtuse angle away from the fourth peripheral edge and connecting to the sixth peripheral edge at a fourth obtuse angle; at least one isosceles triangular ruling for establishing a binding margin, the least one isosceles triangular ruling aligned to the third peripheral edge; and at least one binding width guideline proximate to the third peripheral edge.

BRIEF DESCRIPTION OF THE DRAWINGS

FIGS. 4A, 4B and 4C are enlarged end sections depicting the trimming of the fabric pieces with the obtuse pointed section of the guide to provide trimmed shaped fabric sections in accordance with at least one embodiment of the present invention;

DETAILED DESCRIPTION

Before proceeding with the detailed description, it is to be appreciated that the present teaching is by way of example only, not by limitation. The concepts herein are not limited to use or application with a specific system or method for a quilt binding guide. Thus, although the instrumentalities described herein are for the convenience of explanation shown and described with respect to exemplary embodiments, it will be understood and appreciated that the principles herein may be applied equally in other types of systems and methods involving a binding guide system for easily and advantageously facilitating the fabrication of a binding with flat seams and consistent width.

Figure 1:
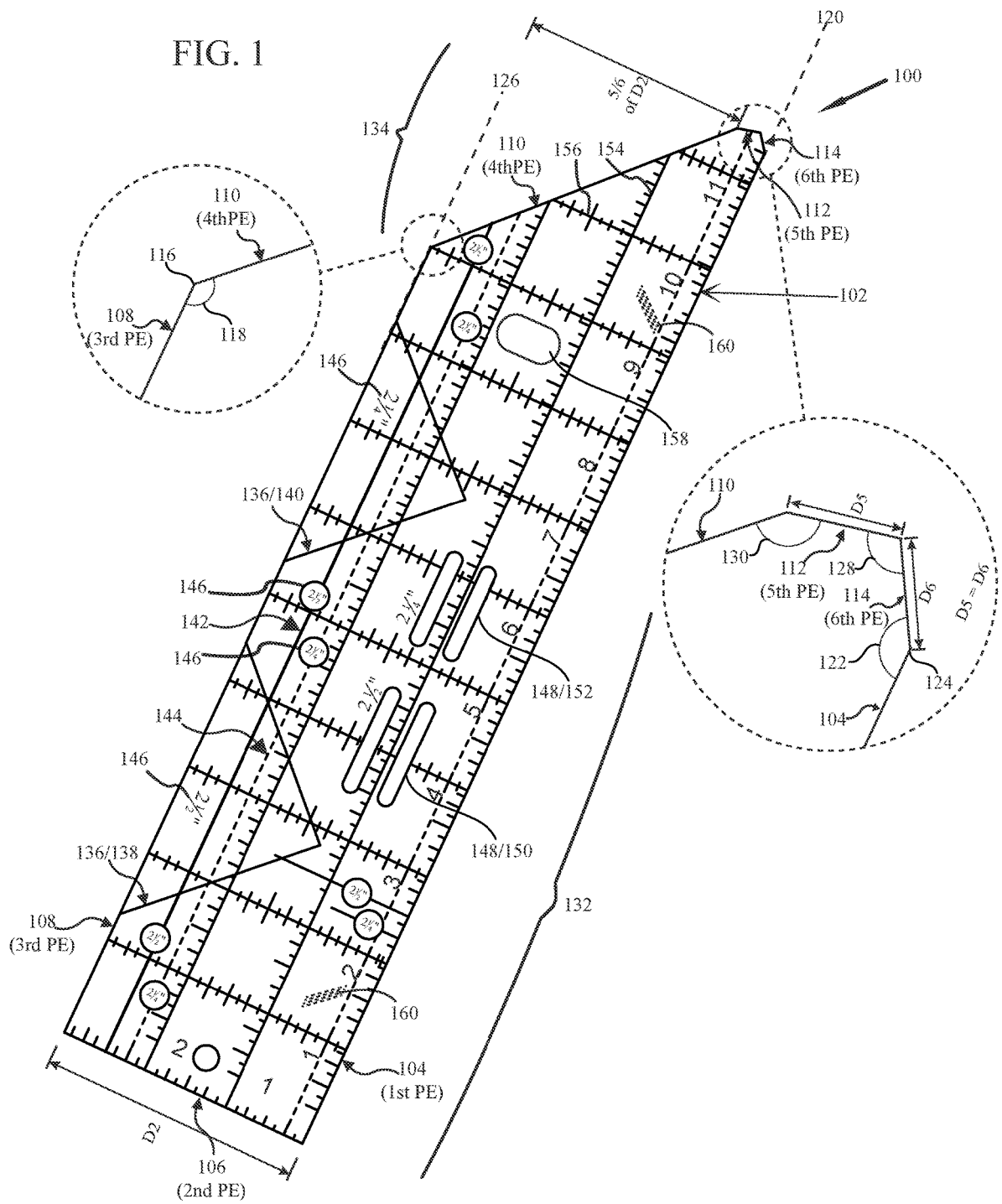
FIG. 1 is a top view of a binding guide in accordance with at least one embodiment of the present invention.

Turning now to FIG. 1, there is shown a binding guide 100 in accordance with at least one embodiment of the present invention. Moreover, the binding guide 100 is presented as a substantially ridged translucent body 102. For at least one embodiment, the translucent body 102 is substantially transparent, save for various markings and indicia that are provided thereon and described further below. In addition, for at least one embodiment, the translucent body 102 is provided by polycarbonate, plastic or other suitable material. Further, for at least one embodiment the translucent body 102 is between 1/16" (0.0625") and 1/4" (0.25") thick, and for at least one embodiment is about 1/8" (0.125") thick.

As shown in FIG. 1, for at least one embodiment, this body 102 is defined by a first peripheral edge 104, a second peripheral edge 106, a third peripheral edge 108, a fourth peripheral edge 110, a fifth peripheral edge 112, and a sixth peripheral edge 114.

The first peripheral edge 104 and the third peripheral edge 108 are substantially parallel to each other and extend normally from opposing ends of the second peripheral edge 106. The first peripheral edge 104 is also longer than the third peripheral edge 108.

The fourth peripheral edge 110 extends away from a first distal end 116 of the third peripheral edge 108 at a first angle 118 generally towards a first plane 120 defined by the first peripheral edge 104. For at least one embodiment this first angle 118 is appreciated to be an obtuse angle. Further, for at least one embodiment this first angle is appreciated to be about 135° (one hundred and thirty-five degrees).

The sixth peripheral edge 114 extends at a second angle 122 from a second distal end 124 of the first peripheral edge 104 towards a second plane 126 defined by the third peripheral edge 108. The second plane 126 is parallel to the first plane 120, and with respect to the plane view of FIG. 1, the first plane 120 and second plane are normal to the second peripheral edge 106.

A fifth peripheral 112 edge joins the distal ends of the fourth peripheral edge 110 and the sixth peripheral edge 114. Further, for at least one embodiment, the length D5 of the fifth peripheral edge 112 is about the same as the length D6 of the sixth peripheral edge 114.

Moreover, the fourth peripheral edge 110 extends at a first obtuse angle 118 away from the third peripheral edge 108. The sixth peripheral edge 114 extends at a second obtuse angle 122 away from the first peripheral edge 104. The fifth peripheral edge 112 extends at a third obtuse angle 128 away from the fourth peripheral edge 110 and connects to the sixth peripheral edge 114 at a fourth obtuse angle 130.

For at least one embodiment, it may be further appreciated that the second peripheral edge 106 has a first length D2. The fourth peripheral edge 110 has a length selected so as to extend to within 5/6$^{th}$ of the first length D2 towards the first plane 120.

More simply stated, the body 102 of the binding guide 100 is a non-regular hexagon body. A non-regular hexagon is understood and appreciated to be a geometric figure where all of the sides and angles do not have the same measure. Indeed, it may be appreciated with respect to FIG. 1 that the first peripheral edge 104, the second peripheral edge 106 and the third peripheral edge 108 define a generally rectangular section 132 of the translucent body 102. In contrast, the fourth peripheral edge 110, the fifth peripheral edge 112 and the sixth peripheral edge defining a generally obtuse pointed section 134 of the translucent body 102.

Each of these six peripheral edges is positioned relative to the others so as to provide an advantageous set of marking and cutting guides—e.g. the outer surface of these peripheral edges—against which the user may deploy a marker, pencil, or cutter, such as a rotary cutter for the advantageous marking/cutting/trimming of fabric pieces which are used to fabricate a desired binding margin. Because each peripheral edge may be used for the precise guidance of a marker or cutter, it will be understood and appreciated that each peripheral edge is generally intended to be continuous.

However, the presence of one or more small incisions/indents/trim slots/or the like may be incorporated into one or more of the noted peripheral edges without significant departure from the teachings herein, and are not considered to interrupt or otherwise segment or subdivide the peripheral edge they are disposed upon. In other words, although for at least one embodiment each peripheral edge is a continuous edge element, for at least one alternative embodiment one or more of the peripheral edges may have minor indents or the like which do not substantially alter or frustrate the intended teachings of the binding guide 100. For such embodiments their presence may be ignored and the peripheral edge considered as a continuous element with respect to the measurement and cutter guide features established by the binding guide 100.

The width of the binding margin provided by the binding guide 100 is of course intended to be consistent along the entire length of the binding margin. To facilitate this, the binding guide 100 provides at least one isosceles triangular ruling 136, e.g., first isosceles triangular ruling 138, for establishing at least one binding margin. As may be appreciated with respect to FIG. 1, for at least one embodiment the at least one isosceles triangular ruling, e.g., first isosceles triangular ruling 138, is aligned to the third peripheral edge 108.

To provide enhanced flexibility and options for the quilter, for at least one embodiment, the binding guide 100 may provide at least one second isosceles triangular ruling 140 to provide a binding margin of a different size from that provided by the first isosceles triangular ruling 106.

In varying embodiments, the size of the binding margin guides may be established under the Metric System or the Imperial System, also referred to as the English or British System. For ease of illustration and discussion, in the embodiments shown and described herein, the binding guide 100 is shown to provide measurements and guides for the Imperial System. More specifically, for the embodiment shown in FIG. 1, the binding guide is shown to provide a first isosceles triangular ruling 138 for a 2½" (2.5") binding margin and a second isosceles triangular ruling 140 for a 2¼" (2.25") binding margin. These sizes for binding margins are quite common in the quilting arts, but it will be fully understood and appreciated that alternative sizes may be provided without departure from the teachings herein.

For each of the isosceles triangular rulings, the binding guide 100 also provides a corresponding binding width guideline. More specifically, for the first isosceles triangular ruling 138 there is a corresponding first binding width guideline 142, appropriately disposed with respect to a baseline. For the embodiment shown, the first binding width guideline 142 is shown and disposed with respect to the first peripheral edge 104 to establish the proper margin width. Moreover, the first binding width guideline 142 for the embodiment as shown establishes a binding width of 2½" (2.5").

For the embodiment shown, a second binding width guideline 144 is also shown corresponding to the second isosceles triangle ruling 140, the second binding width guideline 144 also shown and disposed with respect to the first peripheral edge 104 to establish the proper margin width. Moreover, the second binding width guideline 144 for the embodiment as shown establishes a binding width of 2¼" (2.25").

As the first and second binding width guidelines 142 and 144 are disposed with respect to the first peripheral edge, for the embodiment of the binding guide 100 as shown, binding width guidelines 142 and 144 are proximate to the third peripheral edge 108 and thus also proximate to their respective first and second isosceles triangular rulings 138 and 140. As is shown, the binding guide 100 may include indicia 146 to help a user quickly and easily identify the respective pairings of the isosceles triangular rulings and binding width guidelines for the desired binding margin to be prepared.

As may also be appreciated in FIG. 1, the binding guide 100 also includes at least one set of rectangular apertures 148 aligned parallel to each other and disposed within the translucent body 102. As illustrated the ends of the rectangular apertures may be rounded such that they may be defined or described as rectangular ovals—the rounded ends potentially aiding in smooth passage of fabric therethrough. Further still, for at least one embodiment at least one leading edge of at least one aperture may be rounded or beveled so as to advantageously facilitate the smooth passage of fabric therethrough. As will be further appreciated with respect to the description below, the aligned set of rectangular apertures 148 is a folding guide, advantageously assisting the user to fold the assembled fabric strip into the intended binding margin with a consistent width. It is to be appreciated that to assist as a folding guide, each aperture of the aligned set of rectangular apertures 148 is substantially the same.

As the exemplary embodiment of binding guide 100 has been illustrated to provide a binding margin with a width of 2½" (2.5") or 2¼" (2.25"), the binding guide 100 provides a first set of rectangular apertures 150 for a 2½" (2.5") binding margin, and a second set of rectangular aperture 152 for a 2¼" (2.25") binding margin.

The use of two aligned and precisely spaced apertures has been determined most advantageous over simply one aperture as it aids the user in maintaining alignment of the fold with greater precision and ease than is typically accomplished with a single aperture. The use of two aligned and precisely spaced apertures also has been determined to provide sufficient friction to aid in the folding process, but not an undue amount of friction as may be imparted with three or more apertures. The use of two apertures—an even number—also ensures that the folded fabric enters and exits along the same side of the binding guide 100 which further advantageously facilitates the fabric folding process and may optionally permit the binding guide 100 to present the folded fabric to an iron or heated press to further set the fold.

As measurements between elements of the quilt are typically important to the quilter, for at least one embodiment the binding guide 100 provides a first set of equally spaced rulings 154 running parallel to the first peripheral edge 104. Further still, for yet one embodiment the binding guide 100 provides a second set of equally spaced rulings 156 running perpendicular to the first peripheral edge 104.

For yet another embodiment, a portion of the binding guide 100 may include at least one magnification lens 158 formed in at least a portion of the translucent body 104. Further still, other optional embodiments of the binding guide 100 may include a texture or grippers 160 disposed on the underside of the body 102 to assist with it being placed by hand, and or to provide an improved friction hold upon the fabric during use of the binding guide 100. The binding guide 100 may further provide a hole for easy storage by hanging.

With respect to the above description, at least one embodiment of the binding guide 100 may be summarized as a substantially rigid translucent body 102, having first 104, second 106, third 108, fourth 110, fifth 112 and sixth 114 peripheral edges. The first 104 and third 108 peripheral edges are parallel to each other and extend normally from the second peripheral edge 106, the first peripheral edge 104 being longer than the third peripheral edge 108. The fourth peripheral edge 110 extends at a first angle 118 from a first distal end 116 of the third peripheral edge 108 generally towards a first plane 120 defined by the first peripheral edge 104. The sixth peripheral edge 114 extends at a second angle 122 from a second distal end 124 of the first peripheral edge 104 towards a second plane 126 parallel to the first plane 120, the second plane 126 defined by the third peripheral edge 108. The fifth peripheral edge 112 joins the fourth peripheral edge 110 and the sixth peripheral edge 114. At least one isosceles triangular ruling 136 for establishing a binding margin, is aligned to the third peripheral edge 108 and at least one binding width guideline 140 is provided proximate to and parallel to the third peripheral edge 108. At least one set of aligned parallel rectangular apertures 144 are disposed within the translucent body and structured and arranged to advantageously assist with the folding of the binding margin.

Further still, at least one embodiment of the binding guide 100 may be summarized as a substantially rigid translucent non-regular hexagon body 102, having first 104, second 106 third 108, fourth 110, fifth 112 and sixth 114 peripheral edges. The first 104, second 106 and third 108 peripheral edges define a generally rectangular section 132 of the translucent body 102. The fourth 110, fifth 112 and sixth 114 peripheral edge sections define a generally obtuse pointed section 134 of the translucent body 102. At least one isosceles triangular ruling 136 for establishing a binding margin, is aligned to the third peripheral edge 108 and at least one binding width guideline 140 is provided proximate to and parallel to the third peripheral edge 108. At least one set of aligned parallel rectangular apertures 144 are disposed within the translucent body and structured and arranged to advantageously assist with the folding of the binding margin.

Moreover, for at least one embodiment, the binding guide 100 provides an advantageous unitary quilting tool that is structured and arranged to advantageously assist the user to:

A) cut fabric elements to the proper width to establish a binding margin of a consistent size;

B) trim the fabric elements to provide a sewing margin that facilitates their joining with seams that lie flat and do not bunch with extra fabric when folded;

C) fold the sewn strip of fabric to a consistent binding margin;

D) size the ends of the binding margin appropriately for final seaming when sewn to the quilt core; and additionally/optionally provides E) one or more sets of equally spaced rulings as a typical quilting ruler.

These advantageous elements are provided in one tool thus simplifying and reducing the overall number of tools that the quilter must have and rely upon for the preparation and fabrication of the binding margin.

These features and advantages as described above and with respect to FIG. 1, may be further appreciated with respect to FIGS. 2-8 and with the following description providing an overview of at least one method for use of the binding guide 100.

Figure 2:
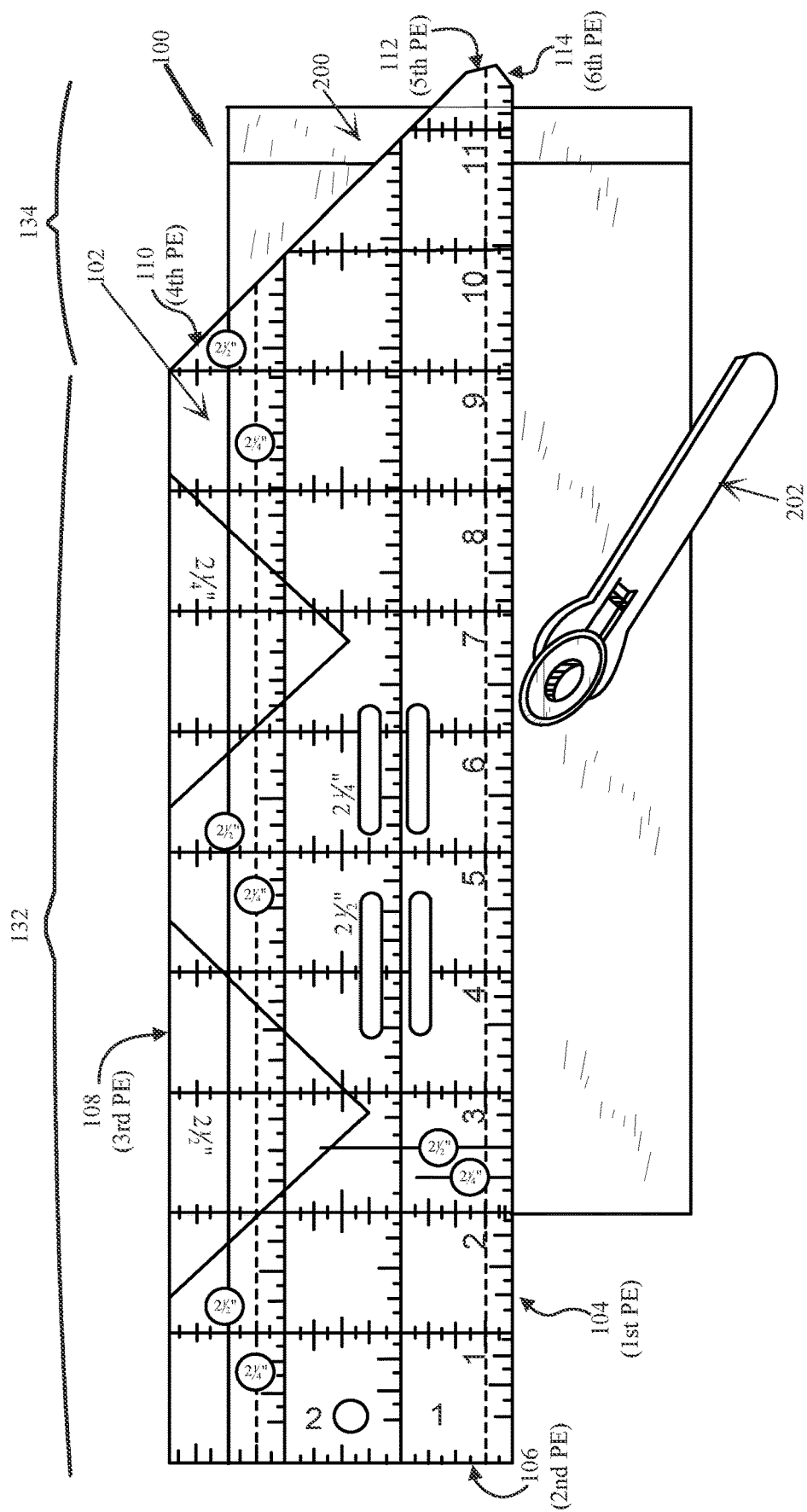
FIG. 2 is a top view of the binding guide disposed upon fabric to be initially trimmed for a binding margin in accordance with at least one embodiment of the present invention.

Turning now to FIG. 2, a piece of fabric 200 has been folded widthwise upon itself and the binding guide 100 is disposed upon the folded fabric 200. The upper edge of the fabric 200 is aligned to the selected binding width guideline, which in FIG. 2 is shown to be the first binding width guideline 140. A cutter 202 is then manipulated by a user along the first peripheral edge 104 to trim the folded fabric 200 to the selected margin width, e.g., 2½" (2.5").

Figure 3:
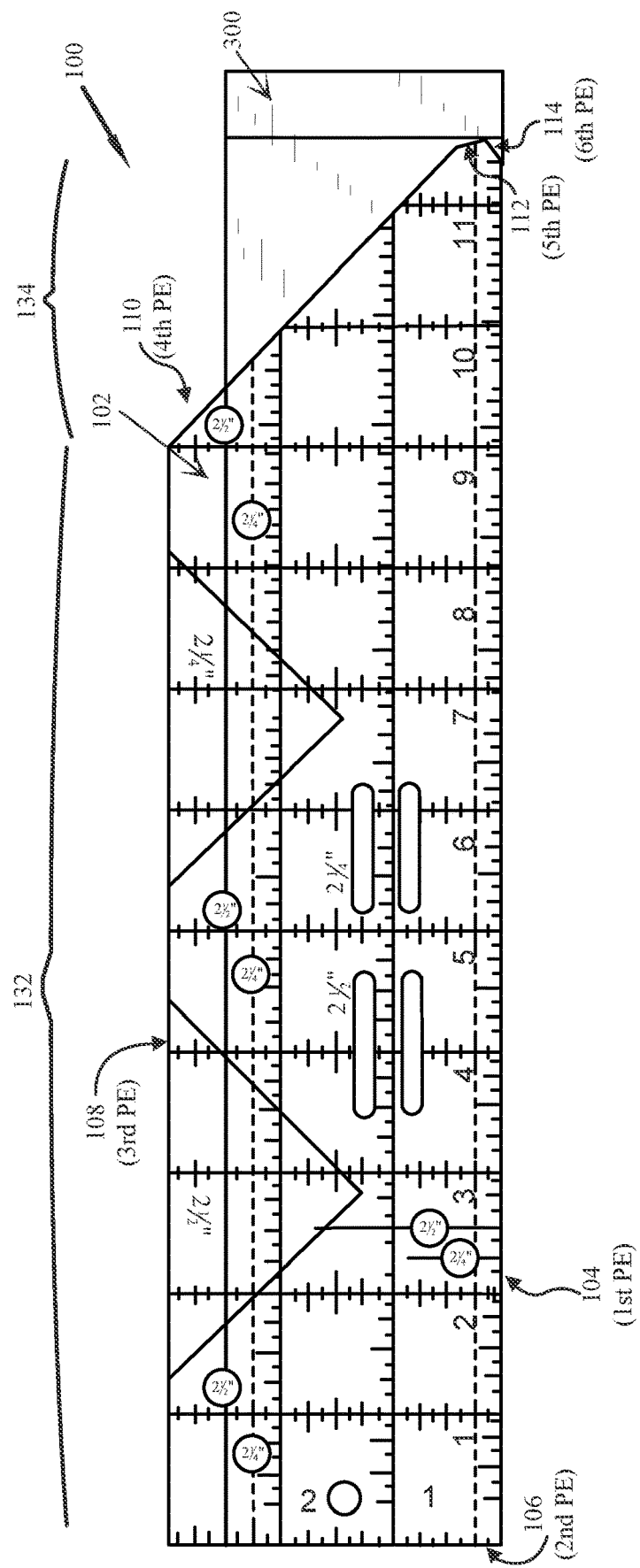
FIG. 3 is a top view of the binding guide repositioned upon the trimmed fabric from FIG. 2, with the obtuse pointed section of the guide positioned over the fabric in preparation for providing pieces of trimmed shaped fabric in accordance with at least one embodiment of the present invention.

In FIG. 3, the binding guide 100 has been repositioned on the trimmed fabric 300 such that the generally obtuse pointed section 132 is disposed over the loose ends of the fabric 300.

As shown in FIGS. 4A, 4B and 4C, at each showing essentially the generally obtuse pointed section 134 of the binding guide 100 as disposed upon the fabric 200, the cutter 202 is now manipulated by the user along the fourth peripheral edge 110 to trim off a first piece of fabric 400, then along the fifth peripheral edge 112 to trim off a second piece of fabric 402, and finally along the sixth peripheral edge 114 to trim off a third piece of fabric 404.

Figure 5A:
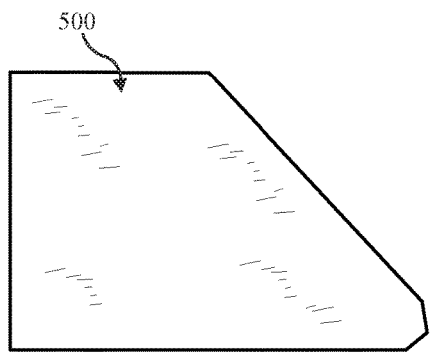
FIGS. 5A, 5B, 5C and 5D present sequential illustrations for the subsequent alignment and joining of the trimmed fabric pieces into a flat strip of fabric for the binding margin in accordance with at least one embodiment of the present invention.

This yields trim shaped fabric 500 disposed below the binding guide 100, shown in FIG. 5A without the binding guide 100. As the fabric is, or was, folded, it is understood and appreciated that the cutting process may actually be applied to more than one layer of fabric at a time, and as such the first, second and third pieces of fabric may be multiple pieces of fabric trimmed at substantially the same time.

Figure 5B:
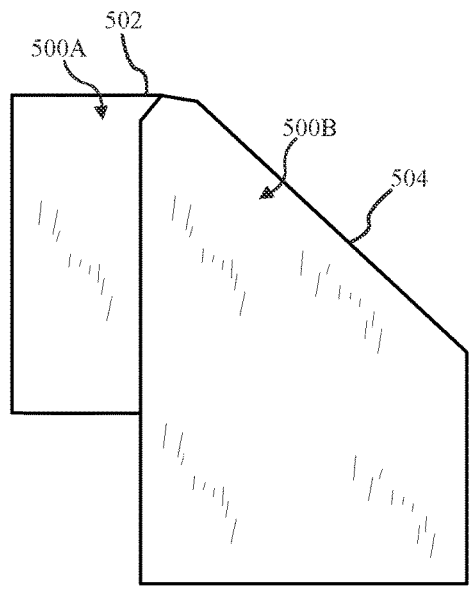
Figure 5C:
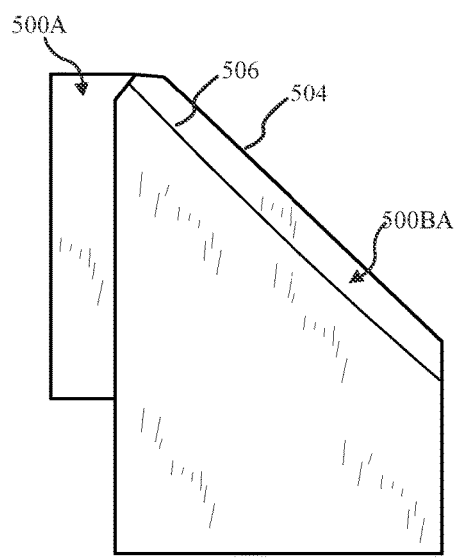

It will be appreciated, that the slope of the fourth peripheral edge 110 is about 45°. As such, as is shown in FIGS. 5B and 5C, when one trimmed end of trim shaped fabric 500A is disposed upon another trim shaped fabric 500B at about 90°, the trimmed end permits easy alignment with no overlap past the side edge 502, and the aligned outer edges 504 substantially align. The binding guide 100 may be disposed upon the aligned ends such that the fourth peripheral edge 110 may be used to provide a sewing guide line 506 along overlapped ends. For at least embodiment this sewing guide line is applied ¼" (0.25") in from the aligned outer edge 504

Figure 5D:
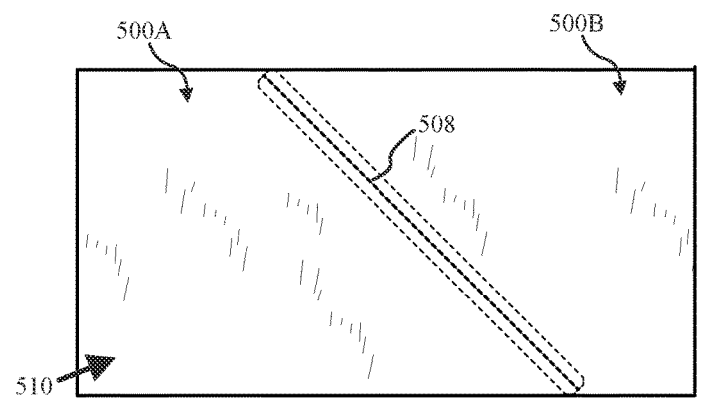
Figure 6:
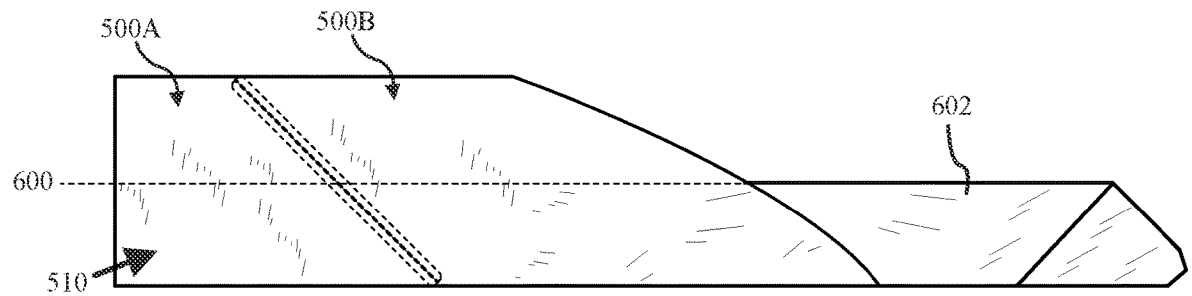
FIG. 6. illustrates the initial folding of the fabric strip to be passed through apertures of the binding guide to provide a uniformly folded binding margin in accordance with at least one embodiment of the present invention.

Trim shaped fabric 500A and trim shaped fabric 500B are then sewn along the sewing guide line 506, shown as stitching 508. The now attached fabrics 500A and 500B are then folded open so as align as a continuous strip of fabric 510 as shown in FIG. 5D. Starting from an end, a few inches of the strip of fabric 510 are folded over a longitudinal middle line 600 to provide folded end 602 as shown in FIG. 6. As is also shown in FIG. 6, the folded end 602 may comprise a trim shaped end.

Figure 7:
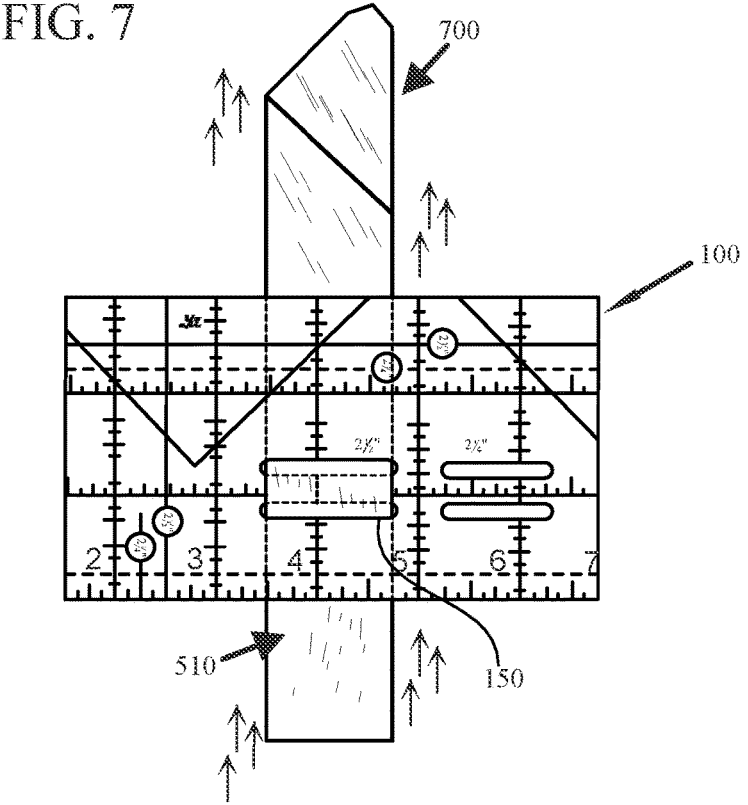
FIG. 7 illustrates the fabric strip as it is passed through the apertures of the binding guide to provide the uniformly folded binding margin in accordance with at least one embodiment of the present invention.

As shown in FIG. 7 this folded end 602 of the strip of fabric 510 is then fed through the appropriate set of rectangular apertures 148, which for the exemplary binding margin of 2¼" (2.5") is first set of rectangular apertures 150. The thickness and resiliency of the material from which the binding guide 100 is fabricated may help achieve a firm crease as the strip of fabric 510 is worked through the first set of rectangular apertures 150 for its entire length. This resulting folded strip is now the unattached binding margin 700.

As the unattached binding margin 700 is pulled out from under the binding guide 100 the user may optionally apply an iron to the fabric to further set the folded seam of the unattached binding margin 700.

Figure 8:
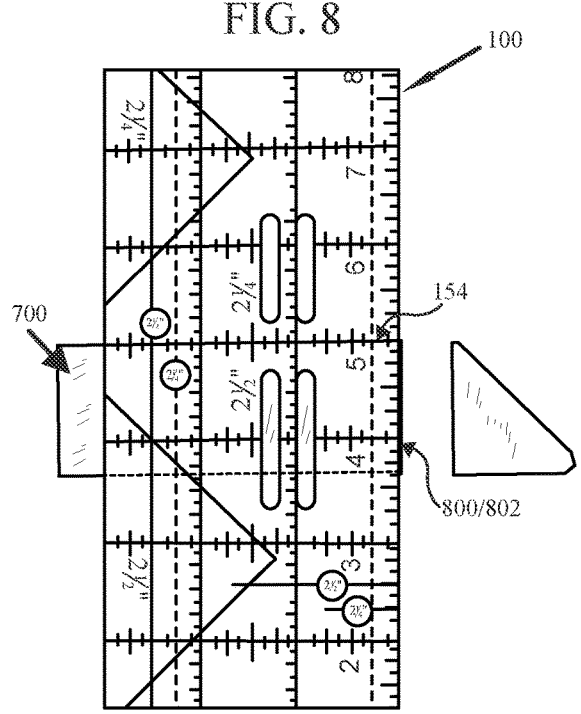
FIG. 8 illustrates the trimming of an end of the folded binding margin to provide a starting end of the margin for sewing to a quilt in accordance with at least one embodiment of the present invention.

As shown in FIG. 8, with the binding margin 700 now substantially prepared, the user may dispose the binding guide 100 across one end of the binding margin 700 at a right angle—as facilitated by the first set of rulings 154, and the end is trimmed off, leaving a new square end 800 to the binding margin 700. This square end 800 may be used as the starting end 802.

Figure 9:
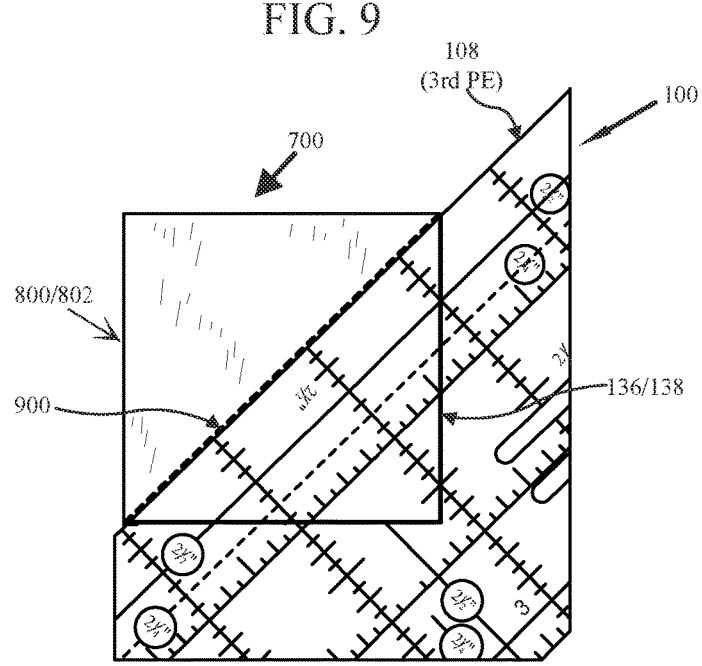
FIG. 9 shows the use of the binding guide to properly mark the end of the binding margin for sewing attachment over the starting end for a finished quilt in accordance with at least one embodiment of the present invention.

As shown in FIG. 9, this starting end 802 is now unfolded. As this exemplary binding margin is 2¼" (2.5)" the first isosceles triangle ruling 138 is aligned to the square end of the now opened starting end 802, and the third peripheral edge 108 is used to mark the sewing line (shown as heavy dashed line 900) for the final seam of the binding margin

700. As is shown in FIG. 9, it will be understood and appreciated that each isosceles triangle ruling 136 has been sized to advantageously accommodate the width of the marking device, e.g., a pencil, such that marked line 900 provides a true guide upon which the final seam will be stitched to result in a flat and precisely aligned row of stitches for a properly sized binding margin 700 about the quilt.

Figure 10:
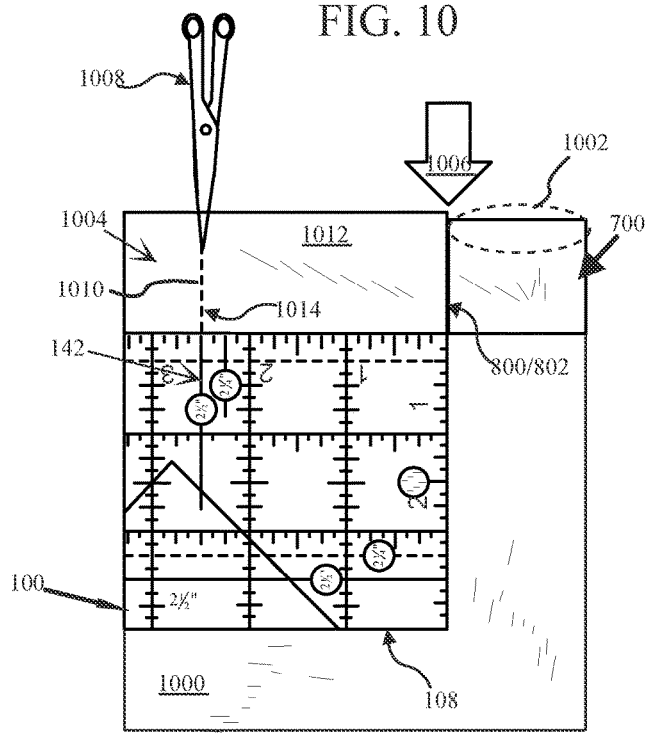
FIG. 10 shows the preparation of the end of the binding margin for alignment with the starting end of the binding margin in accordance with at least one embodiment of the present invention.

The binding margin 700 is now ready for attachment to the quilt 1000, as shown in FIG. 10. To facilitate with the final seaming, the binding margin 700 is disposed upon the quilt and stitching is commenced approximately 10" to 12" inches in from the starting end 802, which is intentionally left free (no stitching shown in dotted oval 1002) to permit the final seam to be sewn. As shown in FIG. 10, the binding margin 700 is sewn around the quilt 1000 as desired, with the binding margin 700 being brought round to overlap the starting end 802 by several inches. For at least one embodiment this overlap is about 10" to 12" for ease of manipulation.

It may be noted that for the corners of the quilt 1000, the binding margin is simply turned 90° flattened, and sewing continued for the attachment of the binding margin 700 to the new side of the quilt 1000.

As shown in FIG. 10, the overlapping end 1004 is then folded back over the binding guide 100, and specifically the first peripheral edge 104 which is aligned with the starting end 802 of the binding margin 700—indicated by large arrow 1006. As the exemplary binding margin is 2¼" (2.5") the first binding width guideline 142 is used by the user to identify the proper margin of overlap to be cut by scissors 1008 along dotted line 1010, to provide overlap margin 1012, with finishing end 1014.

Figure 11:
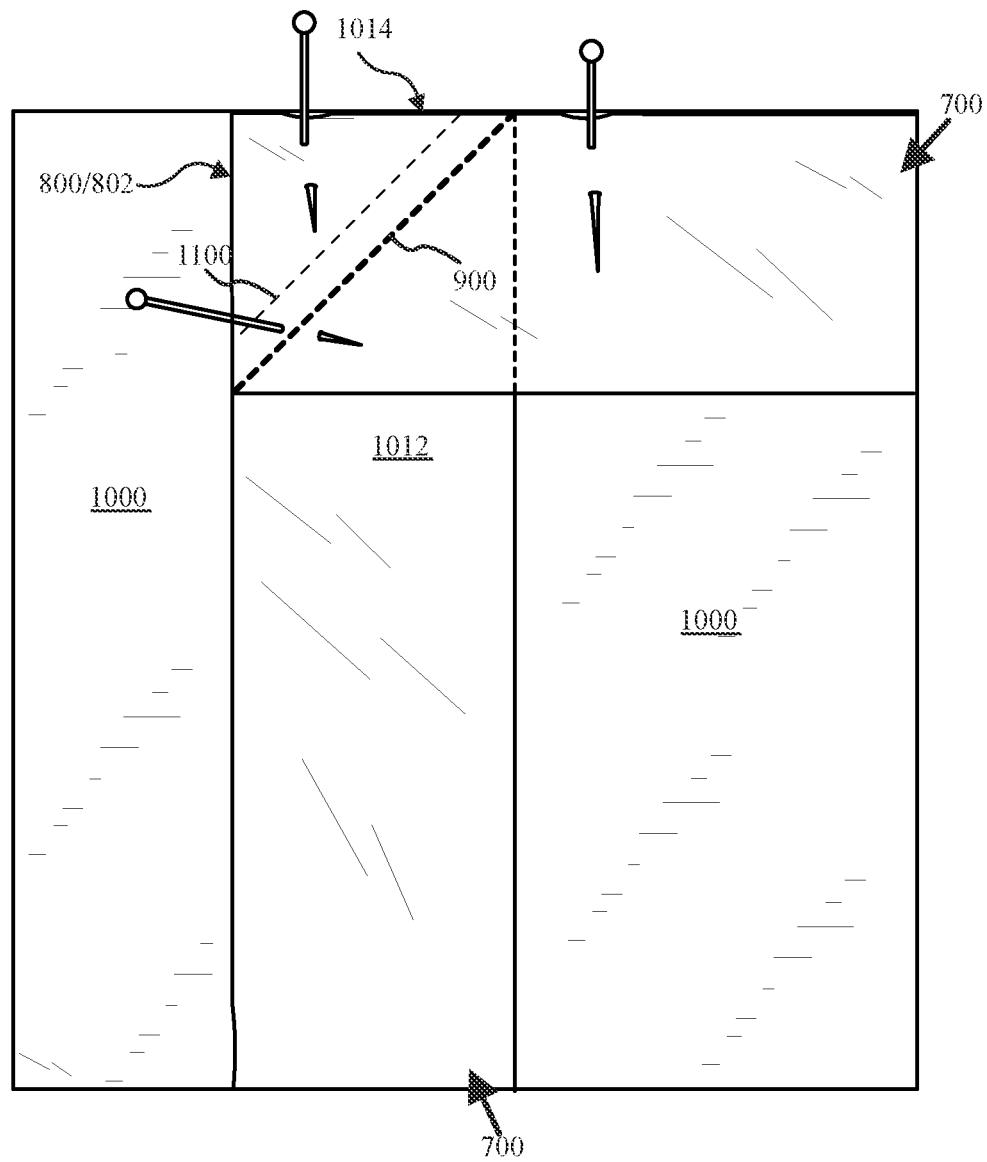
FIG. 11 shows the starting end and the and finishing end of the binding margin aligned for sewing in accordance with at least one embodiment of the present invention.

As shown in FIG. 11, the previously unattached starting end 802 is now unfolded so as to expose the marked line 900. The finishing end 1014 is likewise opened and placed under the unfolded starting end 802 at 90°, and the respective starting end 802 and finishing end 1014 are pinned in alignment. The final seam is then sewn along marked like 900—sewing the ends of the binding margin 700 together, but not to the quilt 1000 shown in the background, and the excess trimmed off at about ¼" to the outside of the sewn line, the trim line shown as dotted line 1100

The binding margin 700 is now a complete and continuous band of fabric. The unsewn starting end 802 and finishing end 1014 are now folded about the edge of the quilt 1000 and the final attachment seam is sewn.

Figure 12:
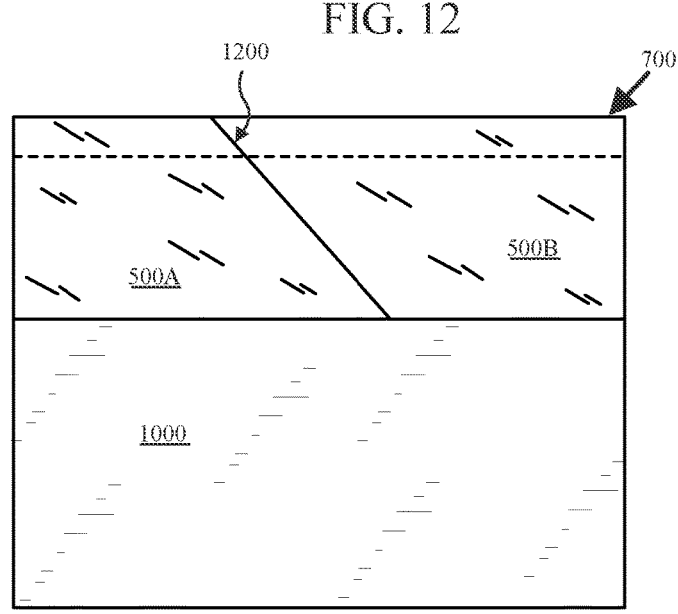
FIG. 12 shows the resulting binging margin as attached to a quilt with flat seams as between the fabric elements comprising the binding margin in accordance with at least one embodiment of the present invention.

FIG. 12 is presented to show the resulting binding margin 700 as attached to the quilt 1000, and more specifically how the binding guide 100 and the process of cutting and trimming the original fabric to provide the trim shaped fabric pieces 500A and 500B, and their subsequent sewing to one another results in a flat seem 1200 which conceals the actual stitching of the union on the underside of the binding margin 700.

Changes may be made in the above methods, systems and structures without departing from the scope hereof. It should thus be noted that the matter contained in the above description and/or shown in the accompanying drawings should be interpreted as illustrative and not in a limiting sense. Indeed many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A binding guide comprising:
a substantially rigid translucent body, having first, second, third, fourth, fifth and sixth peripheral edges, the first and third peripheral edges being parallel to each other and extending normally from the second peripheral edge, the first peripheral edge being longer than the third peripheral edge;
the fourth peripheral edge extending at a first angle from a first distal end of the third peripheral edge generally towards a first plane defined by the first peripheral edge, the sixth peripheral edge extending at a second angle from a second distal end of the first peripheral edge towards a second plane parallel to the first plane, the second plane defined by the third peripheral edge, the fifth peripheral edge joining the fourth peripheral edge and the sixth peripheral edge,
at least one isosceles triangular ruling for establishing a binding margin, the least one isosceles triangular ruling aligned to the third peripheral edge; and
at least one binding width guideline approximate to the third peripheral edge.

2. The binding guide of claim 1, wherein the fifth peripheral edge and the sixth peripheral edge are about equal in length.

3. The binding guide of claim 1, wherein the second peripheral edge has a first length, the fourth peripheral edge having a length to extend to within $5/6^{th}$ of the first length towards the first plane.

4. The binding guide of claim 1, wherein the first angle and the second angle are obtuse angles.

5. The binding guide of claim 1, wherein the body is a non-regular hexagon.

6. The binding guide of claim 1, wherein a first isosceles triangular ruling establishes about a 2.25" binding margin and a second isosceles triangular ruling establishes about a 2.5" binding margin.

7. The binding guide of claim 1, wherein a first binding width guideline establishes about a 2.25" binding width from the first peripheral edge and a second binding width guideline establishes about a 2.5" binding width from the first peripheral edge.

8. The binding guide of claim 1, further including a first set of equally spaced rulings running parallel to the first peripheral edge.

9. The binding guide of claim 1, further including a second set of equally spaced rulings running perpendicular to the first peripheral edge.

10. The binding guide of claim 1, further including at least one set of rectangular apertures, aligned and parallel to each other disposed within the translucent body.

11. The binding guide of claim 1, wherein the first angle is about 135 degrees.

12. A binding guide comprising:
a substantially rigid translucent non-regular hexagon body, having first, second, third, fourth, fifth and sixth peripheral edges, the first, second and third peripheral edges defining a generally rectangular section of the translucent body, the fourth, fifth and sixth peripheral edge sections defining a generally obtuse pointed section of the translucent body; and
at least one isosceles triangular ruling for establishing a binding margin, the least one isosceles triangular ruling aligned to the third peripheral edge; and
at least one binding width guideline approximate to the third peripheral edge.

13. The binding guide of claim 12, wherein the first peripheral edge is longer than the third peripheral edge.

14. The binding guide of claim 12, wherein the fifth peripheral edge and the sixth peripheral edge are about equal in length.

15. The binding guide of claim 12, wherein the first peripheral edge and the third peripheral edge are parallel to each other and extend normally from the second peripheral edge.

16. The binding guide of claim 12, wherein a first isosceles triangular ruling establishes about a 2.25" binding margin and a second isosceles triangular ruling establishes about a 25" binding margin.

17. The binding guide of claim 12, wherein a first binding width guideline establishes about a 2.25" binding width from the first peripheral edge and a second binding width guideline establishes about a 2.5" binding width from the first peripheral edge.

18. The binding guide of claim 12, further including a first set of equally spaced rulings running parallel to the first peripheral edge.

19. The binding guide of claim 12, further including a second set of equally spaced rulings running perpendicular to the first peripheral edge.

20. The binding guide of claim 12, further including at least one set of rectangular apertures, aligned and parallel to each other disposed within the translucent body.

21. A binding guide comprising:
   a substantially rigid translucent non-regular hexagon body, having first, second, third, fourth, fifth and sixth peripheral edges, the first and third peripheral edges being parallel to each other and extending normally from the second peripheral edge, the first peripheral edge being longer than the third peripheral edge;
   the fourth peripheral edge extending at a first obtuse angle away from the third peripheral edge;
   the sixth peripheral edge extending at a second away from the first peripheral edge;
   the fifth peripheral edge extending at a third obtuse angle away from the fourth peripheral edge and connecting to the sixth peripheral edge at a fourth obtuse angle;
   at least one isosceles triangular ruling for establishing a binding margin, the least one isosceles triangular ruling aligned to the third peripheral edge; and
   at least one binding width guideline approximate to the third peripheral edge.

22. The binding guide of claim 21, wherein the fifth peripheral edge and the sixth peripheral edge are about equal in length.

23. The binding guide of claim 21, wherein the first peripheral edge defines a first plane and the third peripheral edge defines a second plane parallel to the first plane, the second peripheral edge has a first length, the fourth peripheral edge having a length to extend to within $5/6^{th}$ of the first length towards the first plane.

24. The binding guide of claim 21, wherein the first isosceles triangular ruling establishes about a 2.25" binding margin and a second isosceles triangular ruling establishes about a 2.5" binding margin.

25. The binding guide of claim 21, wherein a first binding width guideline establishes about a 2.25" binding width from the first peripheral edge and a second binding width guideline establishes about a 2.5" binding width from the first peripheral edge.

26. The binding guide of claim 21, further including a first set of equally spaced rulings running parallel to the first peripheral edge.

27. The binding guide of claim 21, further including a second set of equally spaced rulings running perpendicular to the first peripheral edge.

28. The binding guide of claim 21, further including at least one set of rectangular apertures, aligned and parallel to each other disposed within the translucent body.

29. The binding guide of claim 21, wherein the first angle is about 135 degrees.

* * * * *